C. H. HABECKER.
CORN HARVESTER.
APPLICATION FILED JAN. 25, 1911.
1,068,647.
Patented July 29, 1913.
3 SHEETS—SHEET 3.
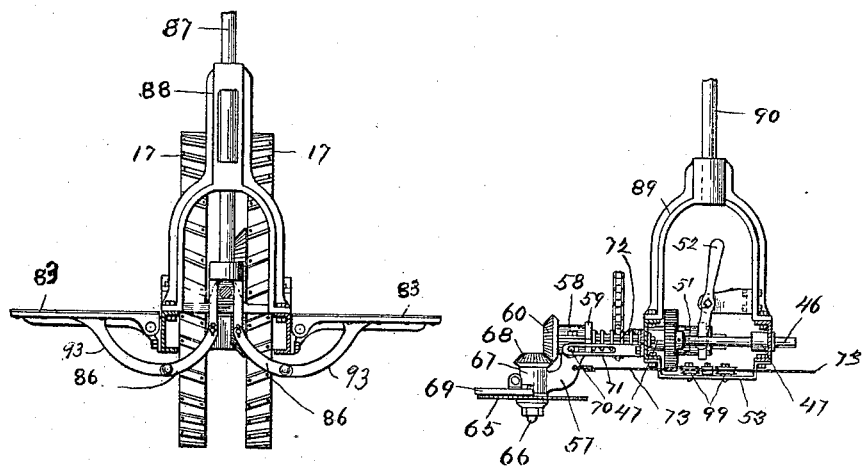
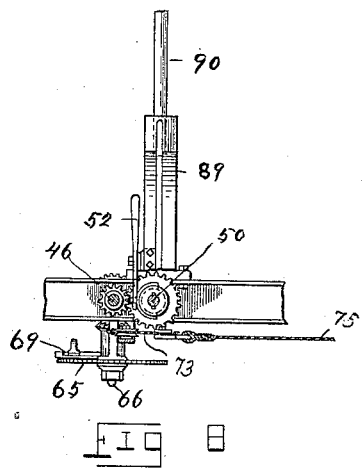
WITNESSES
INVENTOR
Christian H. Habecker,
BY
ATTORNEY

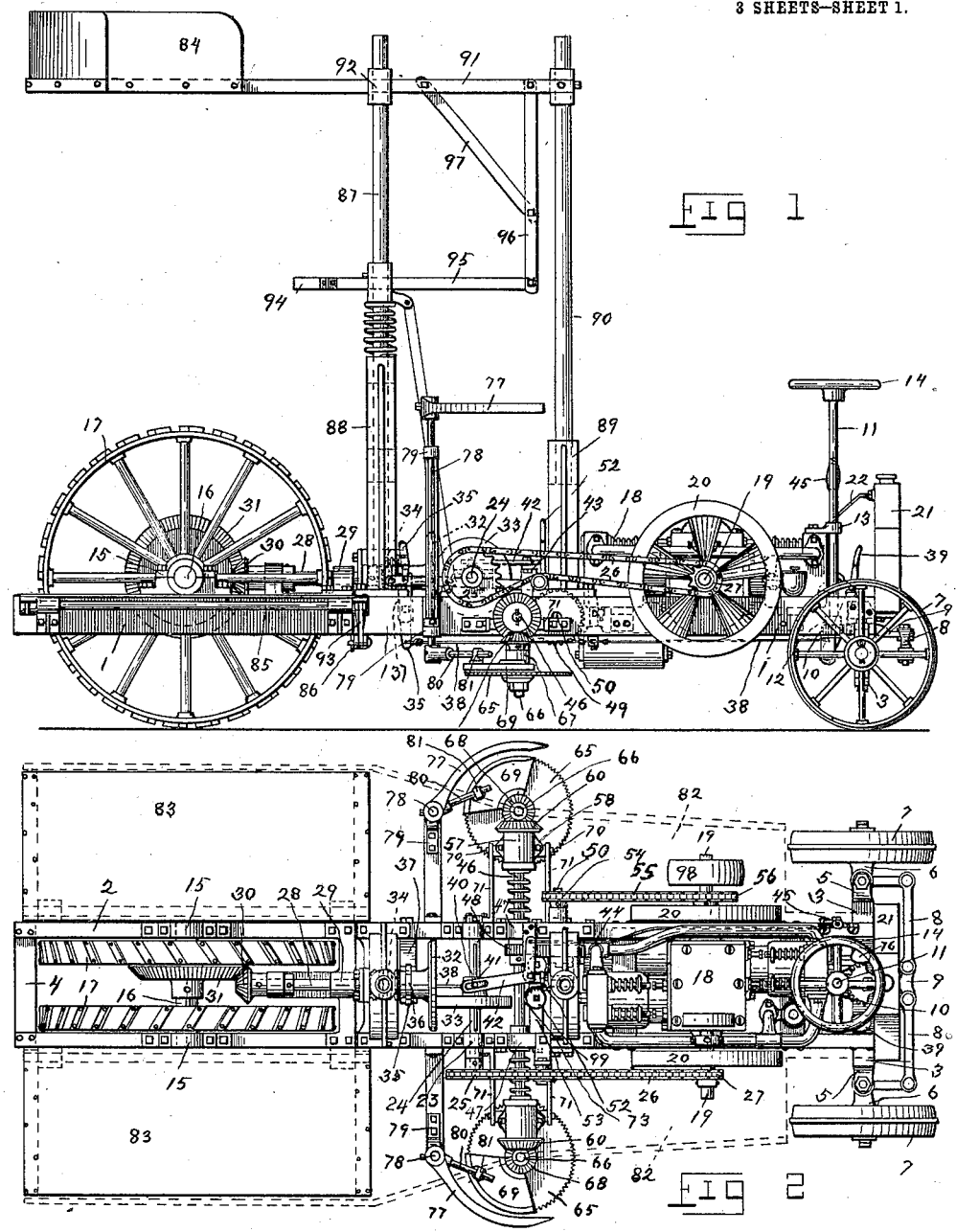

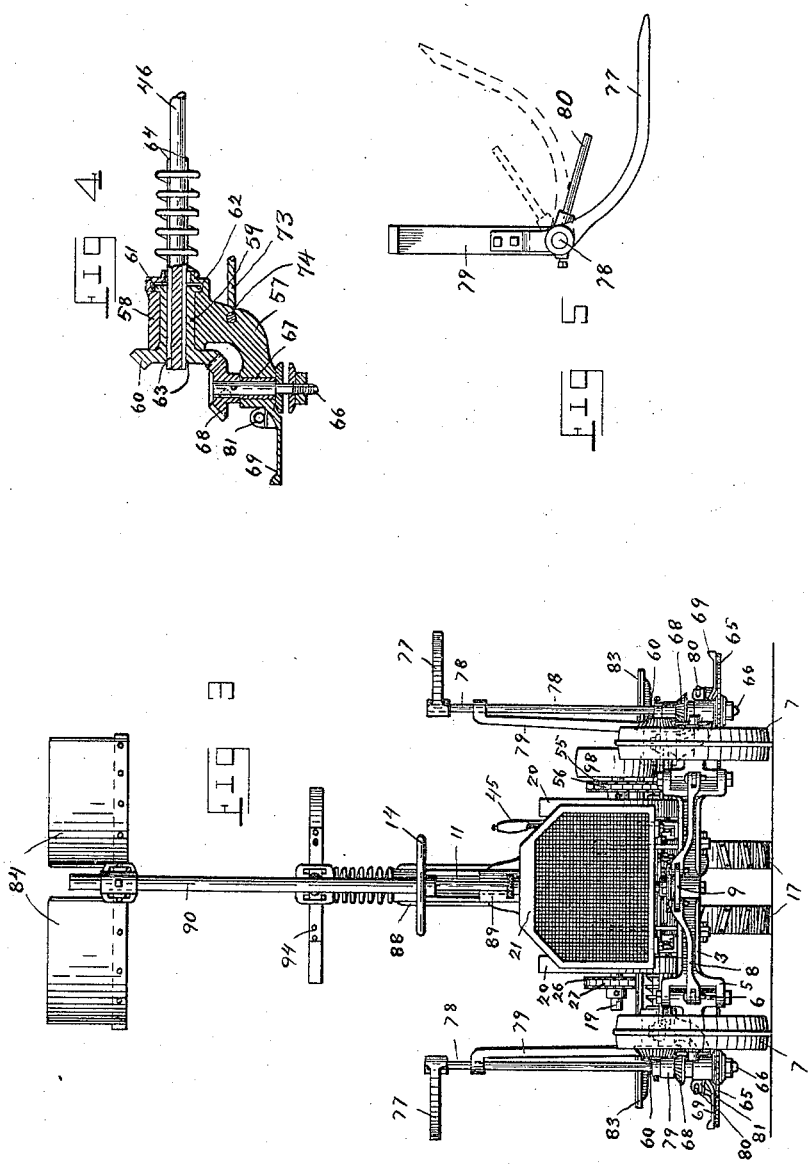

UNITED STATES PATENT OFFICE.

CHRISTIAN H. HABECKER, OF ROHRERSTOWN, PENNSYLVANIA.

CORN-HARVESTER.

1,068,647.      Specification of Letters Patent.      Patented July 29, 1913.

Application filed January 25, 1911. Serial No. 604,544.

*To all whom it may concern:*

Be it known that I, CHRISTIAN H. HABECKER, a citizen of the United States, residing at Rohrerstown, in the county of Lancaster and State of Pennsylvania, have invented certain new and useful Improvements in Corn-Harvesters, of which the following is a specification, reference being had therein to the accompanying drawing.

This invention relates to a self-propelled combined corn-harvester and farm tractor, and constitutes an improvement over my application for a patent on a corn-harvester, filed June 24, 1910, Serial No. 568,614.

The apparatus covered by this application relates more particularly to a machine which is self-propelled, and which is designed, not only to cut standing corn, but which may also be used as a tractor for hauling and also to furnish power for stationary use.

The objects of the invention are to produce a self-contained machine which shall be capable of cutting and shocking corn stalks in a cheap and efficient manner.

Another object is to provide a machine that will be light, easily handled, and of use to the farmer at all seasons of the year.

With these and other objects in view, my invention consists in certain construction and combination of parts as will hereinafter be fully described and illustrated in the accompanying drawings which form a part of this application, and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—Figure 1, is a side elevation of my improved machine, shown with the driver's seat, operator's standing platform and saw aprons or guard plates removed. Fig. 2, is a top plan view of the same, showing the guards and platform in dotted lines. Fig. 3, is a front elevation of the same. Fig. 4, is a partial detail sectional view of the saw supporting mechanism. Fig. 5, is a top plan view of one of the stalk holding arms. Fig. 6, is a cross sectional view looking toward the rear and taken on a line just ahead of the yoke 88. Fig. 7, is a partial detail view of the yoke 89, and saw-operating mechanism. Fig. 8, is a side elevation of the same.

Referring to the drawings, the apparatus comprises the side frames 1, and 2, which are joined together at their forward ends by the axle 3, and at their rear ends by the cross-bar 4.

The axle 3, is formed with the usual yokes 5, within which are pivoted the steering or spindle knuckles 6, upon which are mounted the front steering wheels 7, which are controlled by the steering rods 8, which are pivoted to an arm 9, mounted upon the axle 3, and formed with a gear sector in mesh with a pinion 10, secured on a steering post 11, mounted in a lower bearing 12, secured to said axle 3, and an upper bearing 13, secured to the engine 18; said steering post is supplied with the usual hand-wheel 14.

Near the rear ends of, and to, the side frames 1, and 2, are secured the bearing boxes 15, within which is rotatably mounted the main axle 16, to which are rigidly secured the traction wheels 17, which are close together and act as one wheel.

Toward the forward part of the machine is mounted a gasolene engine or motor 18, which is supplied with a crank shaft 19, extending from both sides thereof, upon the ends of which are secured the fly-wheels 20; the same being formed with fan-blade spokes, which aid in cooling the engine, although as here shown, a radiator 21, is mounted upon the front of the machine and connected with the engine 18, by the usual water pipes 22.

To the rear of the engine 18, in the bearings 23, secured to the frame, is mounted a counter-shaft 24, upon one end of which is secured a sprocket wheel 25, operated by a chain 26, from a sprocket 27, secured upon the crank shaft 19.

The machine is propelled forward and backward by a friction driving mechanism of the usual style, comprising a drive-shaft 28, mounted in a bearing bracket 29, secured to the frame, and has secured upon its rear end, a pinion 30, in mesh with a bevel gear 31, secured upon the main axle 16. The forward end of said drive-shaft 28, is provided with a friction disk 32, which is normally held in driving contact with a friction driving wheel 33, (adjustably mounted on the counter-shaft 24) by a compression spring 34, on said drive-shaft 28, between the bearing 29, and the disk 32; said disk 32, being thrown out of engagement with the friction wheel 33, by a yoke 35, which engages a groove 36, formed in the hub of said disk 32; said yoke 35, being mounted on a bracket 37, secured to the frame 2; said yoke 35, being moved against the tension of the spring 34, by a cable 38, attached thereto and running forward to a foot pedal 39, mounted upon the forward end of the machine. For controlling the speed and reverse movement, the friction driving wheel 33, is slidably mounted on the shaft 24, and may be moved thereon to vary its contact point with the disk 32; by a yoke 40, engaging a groove 41, in the hub of the wheel 33, and attached to a bell-crank 42, mounted upon the bracket 43, attached to the frame 2; said bell-crank 42, being operated by a cable 44, attached thereto and carried forward to a hand-lever 45, mounted upon the side frame 2, near the forward end thereof; said hand-lever 45, being supplied with the usual locking means. It will thus be seen that the shaft 24, is running continually while the engine 18, is in operation, and the machine may be readily started by the clutch yoke 35, operated by the pedal 39; and the speed at which the machine travels and the reverse movement may be controlled by the friction drive-wheel 33, as adjusted by the hand-lever 45.

The mechanism for cutting the corn stalks comprises a transverse shaft 46, which is rotatably mounted in the bearing boxes 47, attached to the frame sides 1, and 2; said shaft being rotated by a pinion 48, secured thereon and driven by a gear 49, rotatably mounted on a counter-shaft 50, and controlled by a clutch 51, mounted on said shaft 50, and operated by the hand-lever 52, secured to the yoke 89. Said shaft 50, is continually rotated, during the running of the engine 18, by a sprocket 54, secured upon one end thereof and connected by a chain 55, to a drive sprocket 56, attached to the crank-shaft 19.

The ends of the shaft 46, which extend beyond the sides of the frame are provided with saw-carrying brackets 57, which are slidably mounted thereon and each of which comprises the horizontal two part bearing 58, within which is rotatably mounted a sleeve 59, provided with a bevel gear 60, upon its outer end, and formed with a flange 61, on its inner end, running in a groove 62, formed in said bearing 58. Said sleeve 59, and supporting bracket 57, are slidably mounted on the shaft 46, by means of said sleeve being provided with one or more keyways 63, which ride on corresponding keys 64, secured in said shaft 46. The saw-blade 65, is mounted upon the lower end of a vertical shaft 66, which is rotatably mounted in a vertical bearing 67, formed in the supporting bracket 57; the upper end of said shaft 66, having secured thereon a bevel gear 68, in mesh with and driven by the bevel gear 60, on the shaft 46. Said supporting bracket 57, is also provided with a saw-guard 69; and for the purpose of further supporting said bracket 57, and preventing the same from turning on the sleeve 59, the same is provided with the eye lugs 70, on opposite sides thereof, which are supported and adapted to slide on the rods 71, which are secured to, and project from, the sides of the frames 1, and 2. The saws 65, are thus rotated by the shaft 46, and they and the supporting brackets 57, are normally held in the extended position shown in Fig. 2, by the compression springs 72, placed on the shaft 46, between the frame and the bracket 57.

For receding the saws and brackets 57, there are provided the cables 73, which have their rear ends secured to an eye 74, in said brackets 57, and which are passed over the rollers 99, mounted on the cross-brace 53, and are then joined together into the cable 75, which extends forward and is operated by the foot pedal 76, and in this manner, the saws 65, may be moved out of the path of the standing corn and such movement will not interfere with their being rotated at the same time.

As a guide and a means of gathering and holding the stalks to the saws 65, the arms 77, are provided and secured upon the vertical rods 78, which are mounted in the ends of the bracket arms 79, extending from, and secured to, the frame side; while upon the lower end of said rods 78, is secured an arm 80, which extends through a swivel stud 81, mounted on the guard plate 69, in such a manner, that when the saws 65, are receded, the arms 77, will be swung in out of the way of the standing stalks.

As the stalks are cut by the saws 65, they are grasped by an attendant (one being placed on either side of the machine upon the platform 82) who passes them toward the rear with their cut ends resting upon the stalk table 83, and their upper ends against the stalk rests 84.

The stalk tables or shocking rests 83, are hinged upon the frame sides, and during the operation of shocking, are held in a raised or extended position by the arms 93, which are secured to the stalk tables 83, and which are connected by the links 86, to the lower end of a vertically movable rod 87, which is slidably mounted in a yoke bearing bracket 88, secured upon the frame sides.

Forward of the shaft 46, is mounted upon the frame side, a second yoke bracket 89, to which is rigidly secured the upright 90, near the upper end of which is pivoted the forward end of an arm 91, which extends rearwardly through a collar 92, secured upon the rod 87; and upon the rear end of said arm 91, are mounted the curved stalk rests 84. Said arm 91, and stalk rests 84, are so arranged as to balance the weight of the shocking tables 83, and sufficient stalks to form a shock, so that when a shock is ready to be deposited by the machine, the weight of the same will depress the tables 83, and by the action of the arms 93, and links 86, the rod 87, will be forced upward, thus raising the stalk rest 84, clear of the tops of the stalks, which are dropped in a standing position; and for forcing or expelling the stalks, there is provided a kicker 94, on the end of an arm 95, which is secured upon the lower end of an arm 96; the upper end of which is pivoted to the arm 91, and braced by the rod 97, secured thereto and to said arm 96; said kicker being forced backward by the upward movement of the rod 87.

When used as a stationary engine or tractor, the saws may be receded or removed, and a belt pulley 98, is provided on the engine shaft.

Having thus described my invention what I claim as new and desire to secure by Letters Patent is:—

In an apparatus of the class described, the combination with a supporting frame mounted upon steering and traction wheels, and having a motor mounted thereon, and a power transmitting mechanism mounted on said frame and comprising a counter shaft driven from said motor, a drive shaft geared to the traction wheels, and variable friction driving means between said drive shaft and said counter-shaft, of a stalk cutting mechanism mounted on said frame, comprising a transverse shaft, rotary cutters slidably mounted on said shaft, and means for sliding the same in and out of cutting engagement with the stalks, a stalk shocking mechanism comprising means for holding the stalks after being cut, and means for ejecting the shock from the machine.

In testimony whereof I affix my signature in presence of two witnesses.

CHRISTIAN H. HABECKER.

Witnesses:
WM. J. COULTER,
JOHN J. THOMPSON.

---

Copies of this patent may be obtained for five cents each, by addressing the "Commissioner of Patents, Washington, D. C."